US012177557B2

(12) United States Patent
Zhang et al.

(10) Patent No.: US 12,177,557 B2
(45) Date of Patent: Dec. 24, 2024

(54) IMAGE PROCESSING METHOD, APPARATUS, DEVICE AND STORAGE MEDIUM

(71) Applicant: Beijing Zitiao Network Technology Co., Ltd., Beijing (CN)

(72) Inventors: Tianyu Zhang, Beijing (CN); Shupeng Zhang, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/517,944

(22) Filed: Nov. 22, 2023

(65) Prior Publication Data

US 2024/0089586 A1    Mar. 14, 2024

Related U.S. Application Data

(63) Continuation of application No. PCT/CN2022/098363, filed on Jun. 13, 2022.

(30) Foreign Application Priority Data

Jul. 1, 2021   (CN) .......................... 202110744004.0

(51) Int. Cl.
   *H04N 23/63*    (2023.01)
   *G06V 10/75*    (2022.01)
   (Continued)

(52) U.S. Cl.
   CPC ......... *H04N 23/632* (2023.01); *G06V 10/751* (2022.01); *H04N 5/268* (2013.01); *H04N 23/61* (2023.01); *H04N 23/62* (2023.01)

(58) Field of Classification Search
   CPC ...... H04N 23/632; H04N 23/61; H04N 23/62; H04N 5/268; G06V 10/751
   (Continued)

(56) References Cited

U.S. PATENT DOCUMENTS 7,349,020 B2 *  3/2008  Stavely ................... G06T 11/60
                                                    348/E5.042
8,214,766 B1 *  7/2012  Berger .................... G06T 11/60
                                                    715/822
(Continued)

FOREIGN PATENT DOCUMENTS

AU       2019259066 A1    10/2020
CN        106210545 A     12/2016
(Continued)

OTHER PUBLICATIONS

Research on Teaching Strategies of Elementary School Science Curriculum in the Information Age, Jan. 31, 2021, pp. 1-5, with English translation (15 pages).
(Continued)

*Primary Examiner* — Pritham D Prabhakher (57) ABSTRACT

The present disclosure provides an image processing method, apparatus, device and storage medium. The method includes: when a predetermined object is detected in a capturing picture on a capturing page, obtaining a corresponding capturing template of the predetermined object, wherein the capturing template is determined based on the predetermined object; applying the capturing template to the capturing picture on the capturing page, and displaying a corresponding preview effect picture of the capturing template on the capturing page. As can be seen, the embodiments of the present disclosure can recommend the capturing template for the user based on the preset object detected in the capturing picture, so that the capturing template recommended for the user has a high degree of matching with the content in the capturing picture, which enriches the functions of the capturing page and improves the capturing experience of the user.

16 Claims, 5 Drawing Sheets

(51) Int. Cl.
*H04N 5/268* (2006.01)
*H04N 23/61* (2023.01)
*H04N 23/62* (2023.01)

(58) Field of Classification Search
USPC .......................................................... 348/239
See application file for complete search history.

(56) References Cited

U.S. PATENT DOCUMENTS

| | | | | |
|---|---|---|---|---|
| 9,942,484 | B2* | 4/2018 | Pan ...................... | G06F 3/0482 |
| 10,425,578 | B1* | 9/2019 | Westheimer ........... | H04N 23/62 |
| 11,100,325 | B2* | 8/2021 | Xu ........................ | G06F 18/241 |
| 11,388,334 | B2* | 7/2022 | Li .......................... | H04N 23/64 |
| 11,645,776 | B2* | 5/2023 | Lui ........................ | H04N 23/64 |
| | | | | 382/103 |
| 2005/0088542 | A1* | 4/2005 | Stavely ................ | H04N 23/632 |
| | | | | 348/E5.042 |
| 2005/0219384 | A1* | 10/2005 | Herberger ............ | H04N 1/3871 |
| | | | | 382/284 |
| 2014/0301663 | A1* | 10/2014 | Livingston ................ | G06T 3/40 |
| | | | | 382/298 |
| 2015/0172534 | A1* | 6/2015 | Miyakawa .............. | H04N 23/61 |
| | | | | 348/222.1 |
| 2015/0172560 | A1* | 6/2015 | Baek .................... | G06V 40/161 |
| | | | | 348/239 |
| 2016/0065843 | A1* | 3/2016 | Zhu ..................... | G06F 16/5838 |
| | | | | 348/207.1 |
| 2016/0366344 | A1* | 12/2016 | Pan ........................ | H04N 23/62 |
| 2019/0174056 | A1* | 6/2019 | Jung ...................... | H04N 23/71 |
| 2019/0294652 | A1* | 9/2019 | Kang ...................... | G06F 40/10 |
| 2020/0184215 | A1 | 6/2020 | Xu et al. | |
| 2020/0396344 | A1* | 12/2020 | Wakabayashi ..... | H04N 1/00307 |
| 2021/0105400 | A1 | 4/2021 | She et al. | |
| 2021/0256598 | A1* | 8/2021 | Nunn ....................... | G06T 7/593 |
| 2021/0258518 | A1* | 8/2021 | Takatsuka .............. | H04N 25/40 |
| 2021/0368094 | A1* | 11/2021 | Li .......................... | G06N 20/00 |
| 2021/0405831 | A1* | 12/2021 | Mourkogiannis .... | G06K 7/1413 |
| 2022/0180551 | A1* | 6/2022 | Lui ..................... | H04N 1/00159 |
| 2022/0210317 | A1* | 6/2022 | Takatsuka .............. | H04N 23/80 |
| 2022/0319033 | A1* | 10/2022 | Kim ....................... | G06V 10/56 |

FOREIGN PATENT DOCUMENTS

| | | |
|---|---|---|
| CN | 107909629 A | 4/2018 |
| CN | 107993191 A | 5/2018 |
| CN | 108174099 A | 6/2018 |
| CN | 108184050 A | 6/2018 |
| CN | 108900923 A | 11/2018 |
| CN | 110602405 A | 12/2019 |
| CN | 112052897 A | 12/2020 |
| CN | 112204942 A | 1/2021 |
| CN | 112351203 A | 2/2021 |
| CN | 112672036 A | 4/2021 |
| CN | 113473017 A | 10/2021 |
| CN | 113473019 A | 10/2021 |
| JP | 2004178210 A | 6/2004 |
| JP | 2012199690 A | 10/2012 |

OTHER PUBLICATIONS

Extended European Search Report and Search Opinion mailed Aug. 22, 2024 in European Application No. 22831673.3 (12 pages).
Notice of Reasons for Refusal issued in JP App. No. JP2023-572548 on Oct. 23, 2024, English translation (5 pages).

* cited by examiner

IMAGE PROCESSING METHOD, APPARATUS, DEVICE AND STORAGE MEDIUM

CROSS-REFERENCE TO RELATED APPLICATION

The present application is a U.S. National Phase Entry of International Patent Application No. PCT/CN2022/098363, filed on Jun. 13, 2022, which claims priority of the Chinese Patent Application No. 202110744004.0 filed on Jul. 1, 2021 and entitled "Image Processing Method, Apparatus, Device and Storage Medium", the disclosure of which is incorporated herein by reference in its entirety as part of the present application.

TECHNICAL FIELD

The present disclosure relates to the data processing field, in particular to an image processing method, apparatus, device and storage medium.

BACKGROUND

With the popularity of multimedia short videos, people's interest in capturing images or videos is rising. How to enrich the functions of capturing pages and improve people's capturing experience is an urgent technical problem that needs to be solved.

SUMMARY

In order to solve the above technical problem or at least partially solve the above technical problem, embodiments of the present disclosure provide an image processing method, which can recommend capturing templates for users based on predetermined objects in the capturing picture, enrich the functions of capturing pages, and improve the capturing experience of users.

In a first aspect, the present disclosure provides an image processing method, which includes:
  when a predetermined object is detected in a capturing picture on a capturing page, obtaining a corresponding capturing template of the predetermined object, the capturing template is determined based on the predetermined object;
  applying the capturing template to the capturing picture on the capturing page, and displaying a corresponding preview effect picture of the capturing template on the capturing page.

In an optional implementation, the corresponding capturing template of the predetermined object includes a plurality of capturing templates, the plurality of capturing templates include a default preview template, and the method further includes:
  displaying the corresponding capturing template of the predetermined object on the capturing page;
  correspondingly, applying the capturing template to the capturing picture on the capturing page, and displaying the corresponding preview effect picture of the capturing template on the capturing page, includes:
  applying the default preview template to the capturing picture on the capturing page, and displaying a corresponding preview effect picture of the default preview template on the capturing page.

In an optional implementation, the capturing template further includes at least one of prop resource, audio resource, virtual reality AR resource or interactive resource.

In an optional implementation, after displaying the corresponding preview effect picture of the default preview template on the capturing page, the method further includes:
  in response to a selection operation for a first capturing template among the plurality of capturing templates, applying the first capturing template to the capturing picture on the capturing page, and switching the corresponding preview effect picture of the default preview template and is displayed on the capturing page to a corresponding preview effect picture of the first capturing template.

In an optional implementation, the method further includes:
  in response to a trigger operation for a recognition closing control on the capturing page, switching a current display state of the capturing template on the capturing page to a hidden state.

In an optional implementation, when the predetermined object is detected in the capturing picture on the capturing page and before obtaining the corresponding capturing template of the predetermined object, the method further includes:
  obtaining the capturing picture on the capturing page and extracting an image feature of the capturing picture;
  matching the image feature with a feature of the predetermined object, and determining that the predetermined object exists on the capturing picture in a case where the matching is successful.

In a second aspect, the present disclosure provides an image processing apparatus, including:
  a first obtaining module, configured to obtain, when a predetermined object is detected in a capturing picture on a capturing page, a corresponding capturing template of the predetermined object; the capturing template is determined based on the predetermined object, and the capturing template at least includes description information of the predetermined object;
  a display module, configured to apply the capturing template to the capturing picture on the capturing page, and display a corresponding preview effect picture of the capturing template on the capturing page.

In a third aspect, the present disclosure provides a computer-readable storage medium, instructions are stored on the computer-readable storage medium, and the instructions, upon being executed by a terminal device, cause the terminal device to implement the above-described method.

In a fourth aspect, the present disclosure provides a device, including: a memory, a processor, and computer program that is stored on the memory and executable on the processor, the processor, upon executing the computer program, implements the above-described method.

In a fifth aspect, the present disclosure provides a computer program product, the computer program product includes computer program/instructions, the computer program/instructions, upon being executed by a processor, implements the above-described method.

Compared with the prior art, the technical solution provided by the embodiments of the present disclosure has the following advantages:

In the image processing method provided by the embodiments of the present disclosure, when a predetermined object is detected in a capturing picture on a capturing page, a corresponding capturing template of the predetermined object is obtained, the capturing template at least includes description information of the predetermined object. Then, the capturing template is applied to the capturing picture on the capturing page, and a corresponding preview effect picture of the capturing template is displayed on the capturing page. As can be seen, the embodiments of the present disclosure can recommend the capturing template for the user based on the predetermined object detected in the capturing picture, so that the capturing template recommended for the user has a high degree of matching with the content in the capturing picture, which enriches the functions of the capturing page and improves the capturing experience of the user.

BRIEF DESCRIPTION OF DRAWINGS

The accompanying drawings are incorporated in and constitute a part of the specification, illustrate embodiments consistent with the present disclosure, and serve to explain the principles of the present disclosure together with the specification.

In order to clearly illustrate the technical solution of the embodiments of the present disclosure or the prior art, the drawings that are needed in the description of the embodiments or the prior art will be briefly described in the following; it is obvious that those skilled in the art can obtain other drawing(s) according to these drawings without any inventive work.

DETAILED DESCRIPTION

In order to make the above objects, characteristics and advantages of the present disclosure more apparent, the technical solutions of the present disclosure will be further described below. It should be noted that the embodiments of the present disclosure and the features in the embodiments can be combined with each other in case of no conflict.

In the following description, many specific details are set forth in order to fully understand the present disclosure, but the present disclosure may be implemented in other ways than those described herein; obviously, the embodiments in the specification are only part of the embodiments of the present disclosure, not all of them.

In order to enrich the functions of a capturing page, the embodiments of the present disclosure provides an image processing method. Specifically, when a predetermined object is detected in a capturing picture on a capturing page, a corresponding capturing template of the predetermined object is firstly obtained, the capturing template at least includes description information of the predetermined object. Then, the capturing template is applied to the capturing picture on the capturing page, and a corresponding preview effect picture of the capturing template is displayed on the capturing page. As can be seen, the embodiments of the present disclosure can recommend the capturing template for the user based on the predetermined object detected in the capturing picture, so that the capturing template recommended for the user has a high degree of matching with the content in the capturing picture, which enriches the functions of the capturing page and improves the capturing experience of the user.

Figure 1:
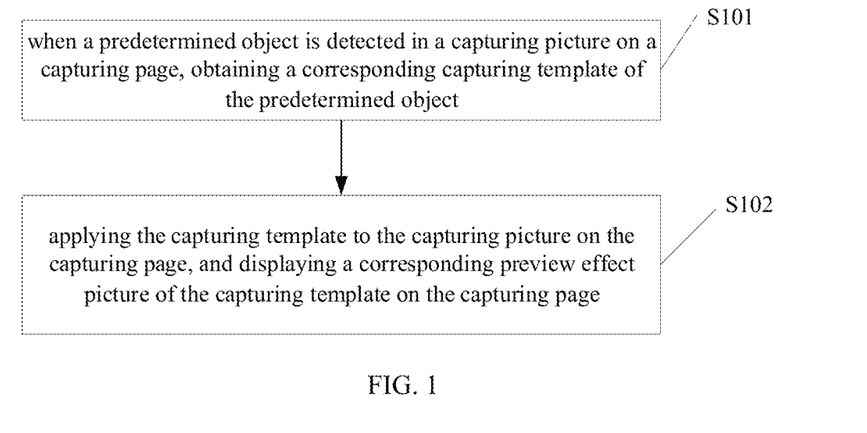
FIG. 1 is a flowchart of an image processing method provided by embodiments of the present disclosure.

Based on this point, embodiments of the present disclosure provides an image processing method. Referring to FIG. 1 which is a flowchart of an image processing method provided by embodiments of the present disclosure, the method includes:

S101: when a predetermined object is detected in a capturing picture on a capturing page, obtaining a corresponding capturing template of the predetermined object.

The capturing template is determined based on the predetermined object, and the capturing template at least includes description information of the predetermined object.

In the embodiments of the present disclosure, in a specific capturing mode, if a capturing page is opened, it is detected whether a predetermined object exists in the capturing picture obtained by a camera; and if it is determined that the predetermined object exists in the capturing picture, a capturing template as determined based on the predetermined object is obtained. The predetermined object may be a predetermined specific object, such as a sunflower, a foxtail, a cola bottle, etc.

In an alternative implementation, firstly, a capturing picture on a capturing page is obtained, which is assumed as a first capturing picture, and then an image feature of the first capturing picture is extracted. The image feature is matched with a feature of the predetermined object, and if the matching is successful, it is determined that the predetermined object exists on the first capturing picture. If the image feature is not successfully matched with the feature of the predetermined object, it means that the predetermined object does not exist on the first capturing picture, and a next frame of a capturing picture relative to the first capturing picture may be obtained, which is assumed as a second capturing picture; and the detection of the predetermined object is continued to be performed on the second capturing picture, until the predetermined object is detected in the capturing picture on the capturing page. The feature of the predetermined object may be obtained and stored in advance, so as to be used as feature matching standard information; for example, the feature of the sunflower may be obtained and stored in advance, so as to be used for matching with the image feature that corresponds to the capturing picture.

In another alternative implementation, the features of a plurality of predetermined objects may be obtained and stored in advance, and after the image feature of the capturing picture on the capturing page is extracted, the image feature is matched with the feature of each predetermined object, and the predetermined object that corresponds to the successfully matched feature is determined. For example, the features of at least three predetermined objects, such as the feature of sunflower, the feature of foxtail and the feature of cola bottle, are obtained and stored in advance; after the image feature of the capturing picture is extracted, the image feature is matched with the feature of sunflower, the feature of foxtail and the feature of cola bottle, respectively; assuming that the matching with the feature of sunflower is successful, the corresponding capturing template of the sunflower is obtained.

In the embodiments of the present disclosure, the corresponding capturing template of the predetermined object includes description information of the predetermined object, the description information of the predetermined object may include the name and attribute information, etc., of the predetermined object. For example, the description information of sunflower may include the name "sunflower", and the attribute information "heliophilous, thriving in the sunlight", etc.

It should be noted that the embodiments of the present disclosure may set various types of description information for the predetermined object based on needs, which is not limited in the embodiments of the present disclosure.

In an alternative implementation, the capturing template may further include at least one of prop resource, audio resource, virtual reality (AR) resource or interactive resource. The prop resource refers to props used for capturing, such as a "cat ear" prop, etc.; the audio resource may include sound effect or music; the AR resource refers to resource with 3D effects, such as a 3D cartoon character, etc.; the interactive resource refers to resource used to realize interactive functions based on interactive controls, such as a purchasing link and a purchasing control of the predetermined object, etc.

S102: applying the capturing template to the capturing picture on the capturing page, and displaying a corresponding preview effect picture of the capturing template on the capturing page.

In the embodiments of the present disclosure, after obtaining the corresponding capturing template of the predetermined object, the capturing template is applied to the capturing picture on the capturing page, and the preview effect picture of the current capturing picture applied with the capturing template is displayed on the capturing page.

Figure 2:
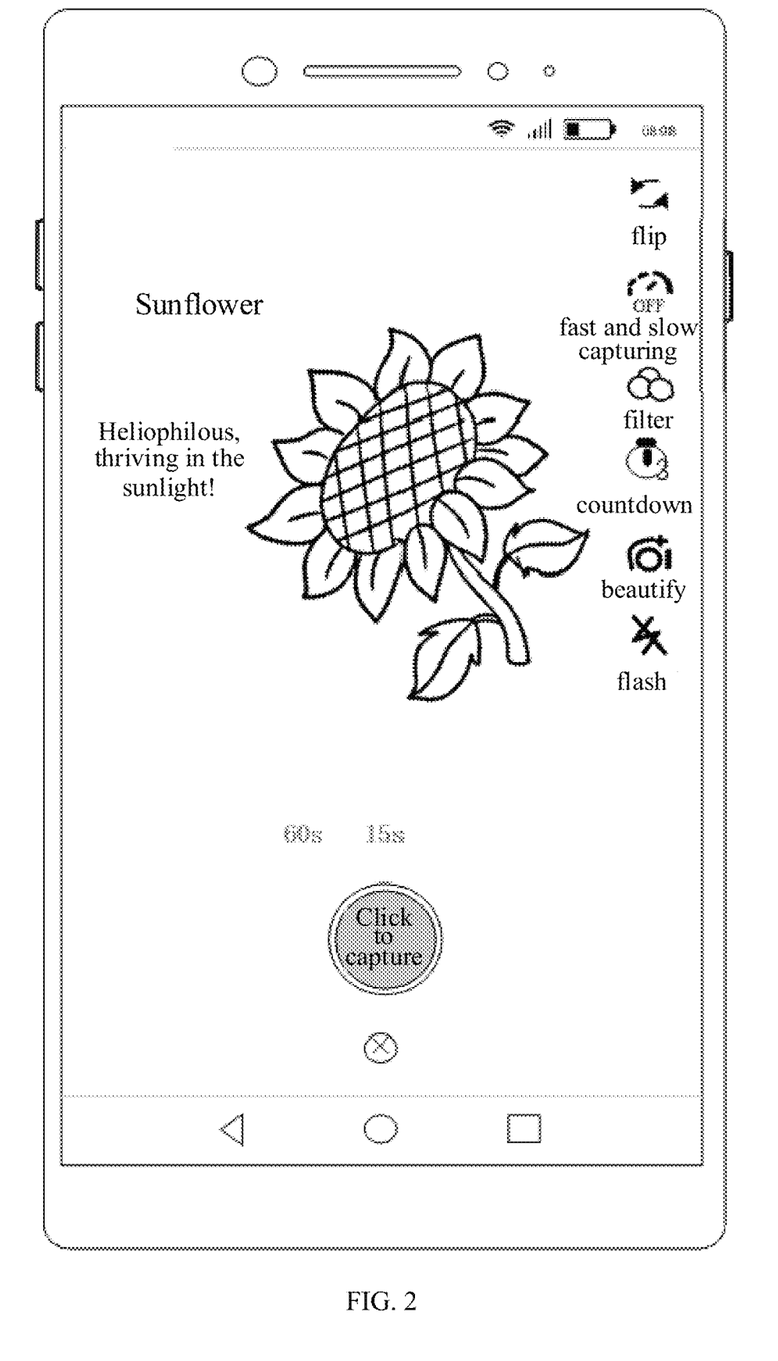
FIG. 2 is a schematic diagram of a capturing page provided by embodiments of the present disclosure.

As shown in FIG. 2 which is a schematic diagram of a capturing page provided by embodiments of the present disclosure, the predetermined object is a sunflower, the preview effect picture of the current capturing picture applied with the corresponding capturing template of the sunflower is displayed on the capturing page, and the preview effect picture shows the description information of sunflower carried in the capturing template, such as the name "sunflower", and the attribute information "heliophilous, thriving in the sunlight", etc.

In practical application, the user may trigger the capturing of an image or video by clicking the capturing control on the capturing page. During the capturing process, the corresponding preview effect picture of the capturing template of the predetermined object is displayed on the capturing page, and the effect of the capturing template is displayed in a capturing result image or a capturing result video obtained after capturing.

In the image processing method provided by the embodiments of the present disclosure, when a predetermined object is detected in a capturing picture on a capturing page, a corresponding capturing template of the predetermined object is obtained, the capturing template at least includes description information of the predetermined object. Then, the capturing template is applied to the capturing picture on the capturing page, and a corresponding preview effect picture of the capturing template is displayed on the capturing page. As can be seen, the embodiments of the present disclosure can recommend the capturing template for the user based on the predetermined object detected in the capturing picture, so that the capturing template recommended for the user has a high degree of matching with the content in the capturing picture, which enriches the functions of the capturing page and improves the capturing experience of the user.

In an alternative implementation, after the predetermined object is detected in the capturing picture on the capturing page, a plurality of capturing templates may be determined based on the predetermined object. After obtaining the plurality of corresponding capturing templates of the predetermined object, the plurality of corresponding capturing templates of the predetermined object are displayed on the capturing page.

Figure 3:
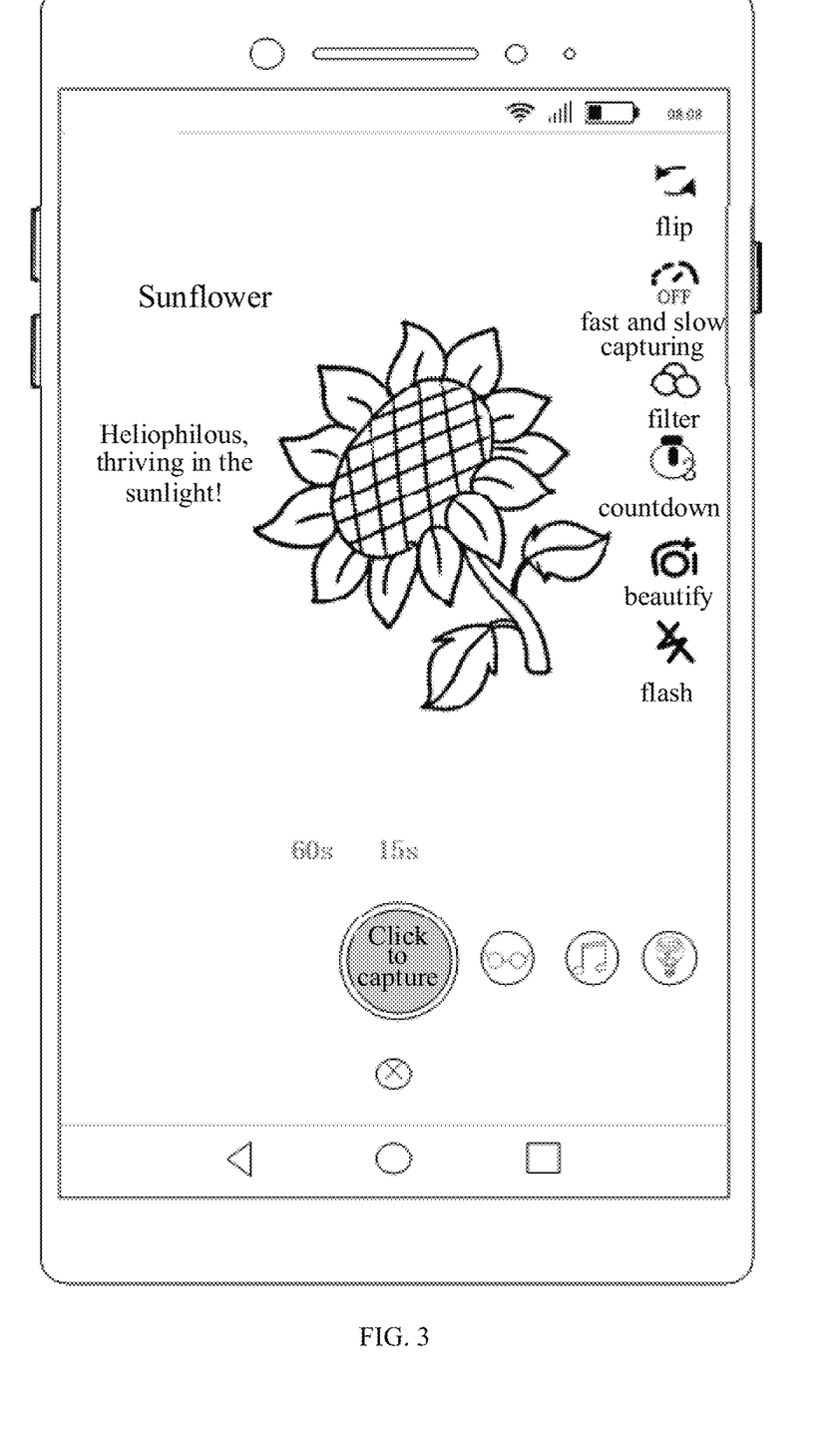
FIG. 3 is a schematic diagram of another capturing page provided by embodiments of the present disclosure.

As shown in FIG. 3 which is a schematic diagram of another capturing page provided by embodiments of the present disclosure, a plurality of corresponding capturing templates of the predetermined object in the capturing picture are displayed at the bottom position of the capturing page, and the currently selected capturing template may be switched by a sliding operation.

In addition, the plurality of corresponding capturing templates of the predetermined object may include a default preview template. When the plurality of corresponding capturing templates of the predetermined object are displayed on the capturing page, the default preview template may also be applied to the capturing picture on the capturing page, and the corresponding preview effect picture of the default preview template is displayed on the capturing page. As shown in FIG. 3, the corresponding preview effect picture of the default preview template is displayed on the capturing page.

In the embodiments of the present disclosure, in response to a selection operation for a first capturing template among the plurality of capturing templates, the first capturing template may be applied to the capturing picture on the capturing page, and the corresponding preview effect picture of the default preview template displayed on the capturing page may be switched to a corresponding preview effect picture of the first capturing template.

In an alternative implementation, the default preview template may be switched, by the sliding operation at the bottom position on the capturing page as shown in FIG. 3, to other capturing template, which is assumed as the first capturing template; and the corresponding preview effect picture of the default preview template displayed on the capturing page may be switched to the corresponding preview effect picture of the first capturing template.

In another alternative implementation, the capturing page may be further provided with a recognition closing control. When a trigger operation for the recognition closing control on the capturing page is received, the current display state of the capturing template on the capturing page may be switched to a hidden state, and at the same time, the preview effect picture of the capturing template is not displayed on the capturing page, that is, the current capturing mode is closed and the capturing mode is restored to a normal capturing mode.

Figure 4:
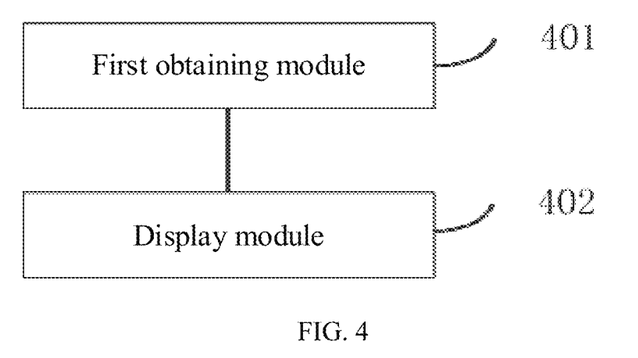
FIG. 4 is a schematic structural diagram of an image processing apparatus provided by embodiments of the present disclosure.

Based on the embodiments of the above method, the present disclosure further provides an image processing apparatus. Referring to FIG. 4 which is a schematic structural diagram of the image processing apparatus provided by embodiments of the present disclosure, the apparatus includes:

a first obtaining module 401, configured to obtain, when a predetermined object is detected in a capturing picture on a capturing page, a corresponding capturing template of the predetermined object; the capturing template is determined based on the predetermined object, and the capturing template at least includes description information of the predetermined object;

a display module 402, configured to apply the capturing template to the capturing picture on the capturing page, and display a corresponding preview effect picture of the capturing template on the capturing page.

In an alternative implementation, the corresponding capturing template of the predetermined object includes a plurality of capturing templates, the plurality of capturing templates include a default preview template, and the apparatus further includes:

a display module, configured to display the corresponding capturing template of the predetermined object on the capturing page;

correspondingly, the display module is specifically configured to:

apply the default preview template to the capturing picture on the capturing page, and display a corresponding preview effect picture of the default preview template on the capturing page.

In an alternative implementation, the capturing template further includes at least one of prop resource, audio resource, virtual reality (AR) resource or interactive resource.

In an alternative implementation, the apparatus further includes:

a first switching module, configured, in response to a selection operation for a first capturing template among the plurality of capturing templates, to apply the first capturing template to the capturing picture on the capturing page, and switch the corresponding preview effect picture of the default preview template and is displayed on the capturing page to a corresponding preview effect picture of the first capturing template.

In an alternative implementation, the apparatus further includes:

a second switching module, configured, in response to a trigger operation for a recognition closing control on the capturing page, to switch a current display state of the capturing template on the capturing page to a hidden state.

In an alternative implementation, the apparatus further includes:

an extracting module, configured to obtain a capturing picture on the capturing page and extract an image feature of the capturing picture;

a matching module, configured to match the image feature with a feature of the predetermined object;

a determining module, configured to determine that the predetermined object exists on the capturing picture in a case where a matching result of the matching module is successful.

In the image processing apparatus provided by the embodiments of the present disclosure, when a predetermined object is detected in a capturing picture on a capturing page, a corresponding capturing template of the predetermined object is obtained, the capturing template at least includes description information of the predetermined object. Then, the capturing template is applied to the capturing picture on the capturing page, and a corresponding preview effect picture of the capturing template is displayed on the capturing page. As may be seen, the embodiments of the present disclosure may recommend the capturing template for the user based on the predetermined object detected in the capturing picture, so that the capturing template recommended for the user has a high degree of matching with the content in the capturing picture, which enriches the functions of the capturing page and improves the capturing experience of the user.

In addition to the above method and apparatus, embodiments of the present disclosure further provides a computer-readable storage medium, instructions are stored on the computer-readable storage medium, and the instructions, upon being executed by a terminal device, cause the terminal device to implement the image processing method described in the embodiment of the present disclosure.

Embodiments of the present disclosure further provides a computer program product, the computer program product includes computer program/instructions, and the computer program/instructions, upon being executed by a processor, implements the image processing method described in the embodiments of the present disclosure.

Figure 5:
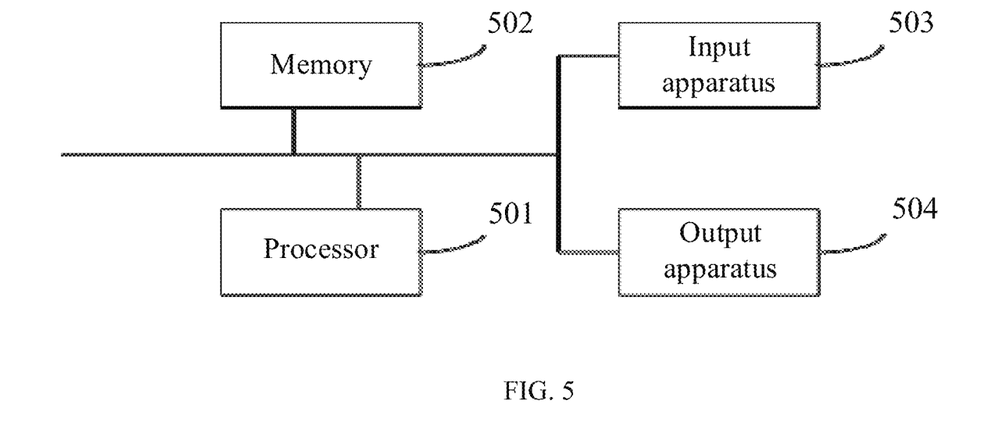
FIG. 5 is a schematic structural diagram of an image processing device provided by embodiments of the present disclosure.

In addition, embodiments of the present disclosure further provides an image processing device, as shown in FIG. 5, which may include:

a processor 501, a memory 502, an input apparatus 503 and an output apparatus 504. The number of the processor 501 in the image processing device may be one or more, and one processor is taken as an example in FIG. 5. In some embodiments of the present disclosure, the processor 501, the memory 502, the input apparatus 503 and the output apparatus 504 may be connected through a bus or other means, and the connection through the bus is taken as an example in FIG. 5.

The memory 502 may be configured to store software programs and modules, and the processor 501 executes various functional applications and data processing of the image processing device by running the software programs and modules stored in the memory 502. The memory 502 may mainly include a program storage region and a data storage region, and the program storage region may store an operating system, application programs required by at least one function, etc. In addition, the memory 502 may include high-speed random-access memory, and may also include non-volatile memory, such as at least one magnetic disk memory, flash memory, or other volatile solid-state memory. The input apparatus 503 may be configured to receive inputted digital or character information and generate signal input related to user settings and function control of the image processing device.

Specifically, in the present embodiment, the processor 501 may follow the following instructions to load executable files that corresponds to the processes of one or more application programs into the memory 502, and the processor 501 may run the application programs stored in the memory 502 to realize various functions of the above-mentioned image processing device.

It should be noted that in the present disclosure, relational terms, such as "first" and "second", etc., are merely used to distinguish one entity or operation from another entity or operation, and do not necessarily require or imply that there is any such factual relationship or order between these entities or operations. Moreover, the terms "including", "comprising" or any other variation thereof are intended to cover non-exclusive inclusion, so that a process, method, article or device that includes a series of elements includes not only these elements, but also other elements that are not explicitly listed or elements that are inherent to such process, method, article or device. Without further restrictions, an element defined by the phrase "including a/an . . . " does not exclude the existence of other identical elements in the process, method, article or device that includes the element.

What is described above is only the specific embodiments of the present disclosure, so that those skilled in the art can understand or realize the present disclosure. Many modifications to these embodiments will be obvious to those skilled in the art, and the general principles defined herein may be implemented in other embodiments without departing from the spirit or scope of the present disclosure. Therefore, the present disclosure is not limited to the embodiments described herein, but to be accorded the widest scope that is consistent with the principles and novel features disclosed herein.

The invention claimed is:

1. An image processing method, comprising:
in response to a predetermined object being detected in a capturing picture on a capturing interface, obtaining a corresponding capturing template of the predetermined object, wherein the capturing template is determined based on the predetermined object, and the capturing template is a predefined capturing style; and
applying the capturing template to the capturing picture on the capturing interface, and displaying a corresponding preview effect picture of the capturing template on the capturing interface;
wherein the corresponding capturing template of the predetermined object comprises a plurality of capturing templates, the plurality of capturing templates include a default preview template, and the method further comprises:
displaying the corresponding capturing template of the predetermined object on the capturing interface;
wherein applying the capturing template to the capturing picture on the capturing interface, and displaying the corresponding preview effect picture of the capturing template on the capturing interface, comprises:
applying the default preview template to the capturing picture on the capturing interface, and displaying a corresponding preview effect picture of the default preview template on the capturing interface.

2. The method according to claim 1, wherein the capturing template comprises description information of the preset object.

3. The method according to claim 1, wherein after displaying the corresponding preview effect picture of the default preview template on the capturing interface, the method further comprises:
in response to a selection operation for a first capturing template among the plurality of capturing templates, applying the first capturing template to the capturing picture on the capturing interface, and switching the corresponding preview effect picture, which is displayed on the capturing interface, of the default preview template into a corresponding preview effect picture of the first capturing template.

4. The method according to claim 1, wherein the capturing template comprises description information of the predetermined object.

5. The method according to claim 4, wherein the capturing template further comprises at least one of prop resource, audio resource, virtual reality AR resource or interactive resource;
wherein the prop resource is a special effect or a virtual sticker that is displayed superposing on the capturing picture.

6. The method according to claim 4, wherein the capturing template further comprises at least one of prop resource, audio resource, virtual reality AR resource or interactive resource;
wherein the prop resource is a special effect or a virtual sticker that is displayed superposing on the capturing picture.

7. The method according to claim 1, wherein the method further comprises:
in response to a trigger operation for a recognition closing control on the capturing interface, switching a current display state of the capturing template on the capturing interface to a hidden state.

8. The method according to claim 1, wherein in response to the predetermined object being detected in the capturing picture on the capturing interface and before obtaining the corresponding capturing template of the predetermined object, the method further comprises:
obtaining the capturing picture on the capturing interface and extracting an image feature of the capturing picture;
matching the image feature with a feature of the predetermined object, and determining that the predetermined object exists on the capturing picture in response to the matching being successful.

9. A device, comprising: a memory, a processor, and computer program that is stored on the memory and executable on the processor, wherein the processor, upon executing the computer program, implements the method according to claim 1.

10. An image processing apparatus, comprising:
a first obtaining module, configured to obtain, in response to a predetermined object being detected in a capturing picture on a capturing interface, a corresponding capturing template of the predetermined object; wherein the capturing template is determined based on the predetermined object, the capturing template is a predefined capturing style, and the capturing template at least comprises description information of the predetermined object; and
a display module, configured to apply the capturing template to the capturing picture on the capturing interface, and display a corresponding preview effect picture of the capturing template on the capturing interface;
wherein the capturing template corresponding to the preset object comprises a plurality of capturing templates, the plurality of capturing templates comprise a default preview template, and the display module is further configured to:
displaying the corresponding capturing template of the predetermined object on the capturing interface;
wherein applying the capturing template to the capturing picture on the capturing interface, and displaying the corresponding preview effect picture of the capturing template on the capturing interface, comprises:
applying the default preview template to the capturing picture on the capturing interface, and displaying a corresponding preview effect picture of the default preview template on the capturing interface.

11. The apparatus according to claim 10, wherein after displaying the corresponding preview effect picture of the default preview template on the capturing interface, the display module is further configured to:
in response to a selection operation for a first capturing template among the plurality of capturing templates, applying the first capturing template to the capturing picture on the capturing interface, and switching the corresponding preview effect picture, which is displayed on the capturing interface, of the default preview template into a corresponding preview effect picture of the first capturing template.

12. The apparatus according to claim 10, wherein the capturing template comprises description information of the preset object.

13. The apparatus according to claim 12, wherein the capturing template further comprises at least one of prop resource, audio resource, virtual reality AR resource or interactive resource;
   wherein the prop resource is a special effect or a virtual sticker that is displayed superposing on the capturing picture.

14. A computer-readable non-transitory storage medium, wherein instructions are stored on the computer-readable non-transitory storage medium, and the instructions, upon being executed by a terminal device, cause the terminal device to:
   in response to a predetermined object being detected in a capturing picture on a capturing interface, obtain a corresponding capturing template of the predetermined object, wherein the capturing template is determined based on the predetermined object, and the capturing template is a predefined capturing style; and
   apply the capturing template to the capturing picture on the capturing interface, and displaying a corresponding preview effect picture of the capturing template on the capturing interface;
   wherein the capturing template corresponding to the preset object comprises a plurality of capturing templates, the plurality of capturing templates comprise a default preview template, and the terminal device is further caused to:
   display the corresponding capturing template of the predetermined object on the capturing interface;
   wherein applying the capturing template to the capturing picture on the capturing interface, and displaying the corresponding preview effect picture of the capturing template on the capturing interface, comprises:
   applying the default preview template to the capturing picture on the capturing interface, and displaying a corresponding preview effect picture of the default preview template on the capturing interface.

15. The computer-readable non-transitory storage medium according to claim 14, wherein the capturing template comprises description information of the preset object.

16. The computer-readable non-transitory storage medium according to claim 15, wherein the capturing template further comprises at least one of prop resource, audio resource, virtual reality AR resource or interactive resource;
   wherein the prop resource is a special effect or a virtual sticker that is displayed superposing on the capturing picture.

\* \* \* \* \*